US010513985B2

(12) United States Patent
Ricci

(10) Patent No.: US 10,513,985 B2
(45) Date of Patent: Dec. 24, 2019

(54) FIRE MITIGATION SYSTEM FOR GAS TURBINE ENGINE

(71) Applicant: PRATT & WHITNEY CANADA CORP., Longueuil (CA)

(72) Inventor: Thomas Trevor Ricci, Kirkland (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 511 days.

(21) Appl. No.: 15/333,775

(22) Filed: Oct. 25, 2016

(65) Prior Publication Data

US 2018/0112598 A1  Apr. 26, 2018

(51) Int. Cl.
 *F02C 7/25* (2006.01)
 *F02C 7/22* (2006.01)
 *F02C 3/04* (2006.01)

(52) U.S. Cl.
 CPC ............... *F02C 7/25* (2013.01); *F02C 7/222* (2013.01); *F02C 3/04* (2013.01)

(58) Field of Classification Search
 CPC .......... F01D 25/20; F02C 7/236; F02C 7/225; B64D 37/32; B64D 2045/009
 See application file for complete search history.

(56) References Cited

U.S. PATENT DOCUMENTS

| 4,090,524 A | * | 5/1978 | Allread | B64D 37/32 137/614.02 |
| 2012/0181288 A1 | * | 7/2012 | Childress | B23P 11/00 220/586 |

* cited by examiner

*Primary Examiner* — Gerald L Sung
(74) *Attorney, Agent, or Firm* — Norton Rose Fulbright Canada LLP

(57) ABSTRACT

The described gas turbine engine includes a fire mitigation system in fluid system thereof, and includes an air-introduction component located in a fluid conveying conduit upstream of a liquid pump of the fluid system. The air-introduction component has a sacrificial element which remains in place during normal operation of the gas turbine engine but has a heat-induced failure point lower than that of a remainder of the fluid conveying conduit such that it fails when exposed to a threshold temperature greater than the heat-induced failure point. Failure of the sacrificial element allows air introduction into the fluid conveying conduit upstream of the liquid pump, thereby starving the liquid pump in the event of a fire condition generating the threshold temperature.

18 Claims, 5 Drawing Sheets

FIRE MITIGATION SYSTEM FOR GAS TURBINE ENGINE

TECHNICAL FIELD

The present disclosure relates generally to gas turbine engines, and more particularly to oil and/or fuel systems of gas turbine engines.

BACKGROUND

Gas turbine engines used in civil aviation must meet certain fire resistance standards for airworthiness certification purposes. Accordingly, many different fire prevention and/or fire-proofing systems exist. Oil and fuel systems are often particularly targeted by such fire prevention systems, in order to safeguard and control, or shut down, individual systems and/or the complete engine in the unlikely event that a fire condition is detected. It is particularly undesirable for fuel pumps and/or oil pumps of gas turbine engines to continue operating in the event of a fire condition, as this may increase the risk of the fire spreading or increasing in severity.

Most existing fire detection and mitigation systems for gas turbine engines use electric sensors placed in fire critical regions, and require other associated electric systems and/or electronics connected with these sensors. Such systems are therefore necessarily dependent upon electrical systems, including sensors and switches, for actuation.

SUMMARY

There is therefore provided a gas turbine engine comprising: a fluid system including at least one liquid pump providing motive flow of a liquid through the fluid system; and a fire mitigation system including an air-introduction component located in a fluid conveying conduit upstream of the at least one liquid pump, the air-introduction component having a sacrificial element which remains in place during normal operation of the gas turbine engine, the sacrificial element having a heat-induced failure point lower than that of a remainder of the fluid conveying conduit, the sacrificial element configured to fail when exposed to a threshold temperature greater than the heat-induced failure point to allow air entry into the fluid conveying conduit upstream of the liquid pump, thereby starving the liquid pump in the event of a fire condition generating said threshold temperature.

There is also provided a fuel system of a gas turbine engine adapted to feed fuel from a fuel tank to fuel nozzles within the combustor of the gas turbine engine, the fuel system comprising: a fuel pump unit disposed between the fuel tank and the fuel nozzles, the fuel pump unit including a fuel pump operable to pump fuel to the fuel nozzles; and a fire mitigation system located upstream of the fuel pump unit and inline within a fuel conveying conduit interconnecting the fuel tank and the fuel pump unit, the fire mitigation system including an air-introduction component with a sacrificial element within the fuel conveying conduit which remains in place during normal operation of the gas turbine engine, the sacrificial element having a heat-induced failure point lower than that of a remainder of the fuel conveying conduit, the sacrificial element configured to fail when exposed to a threshold temperature greater than the head-induced failure point to form an air inlet opening in the fuel conveying conduit upstream of the fuel pump unit and allow air introduction into the fuel system upstream of the fuel pump unit, thereby starving the fuel pump in the event of a fire condition generating said threshold temperature.

There is further provided a method of deactivating a liquid distribution system of a gas turbine engine in the event of a fire condition, the liquid distribution system including a liquid pump, the method comprising introducing a quantity of air into the liquid distribution system at a location upstream of the liquid pump, said quantity of air being greater than a liquid discharge capacity of the liquid pump, thereby starving the liquid pump.

BRIEF DESCRIPTION OF THE DRAWINGS

Reference is now made to the accompanying figures in which.

DETAILED DESCRIPTION

Figure 1:
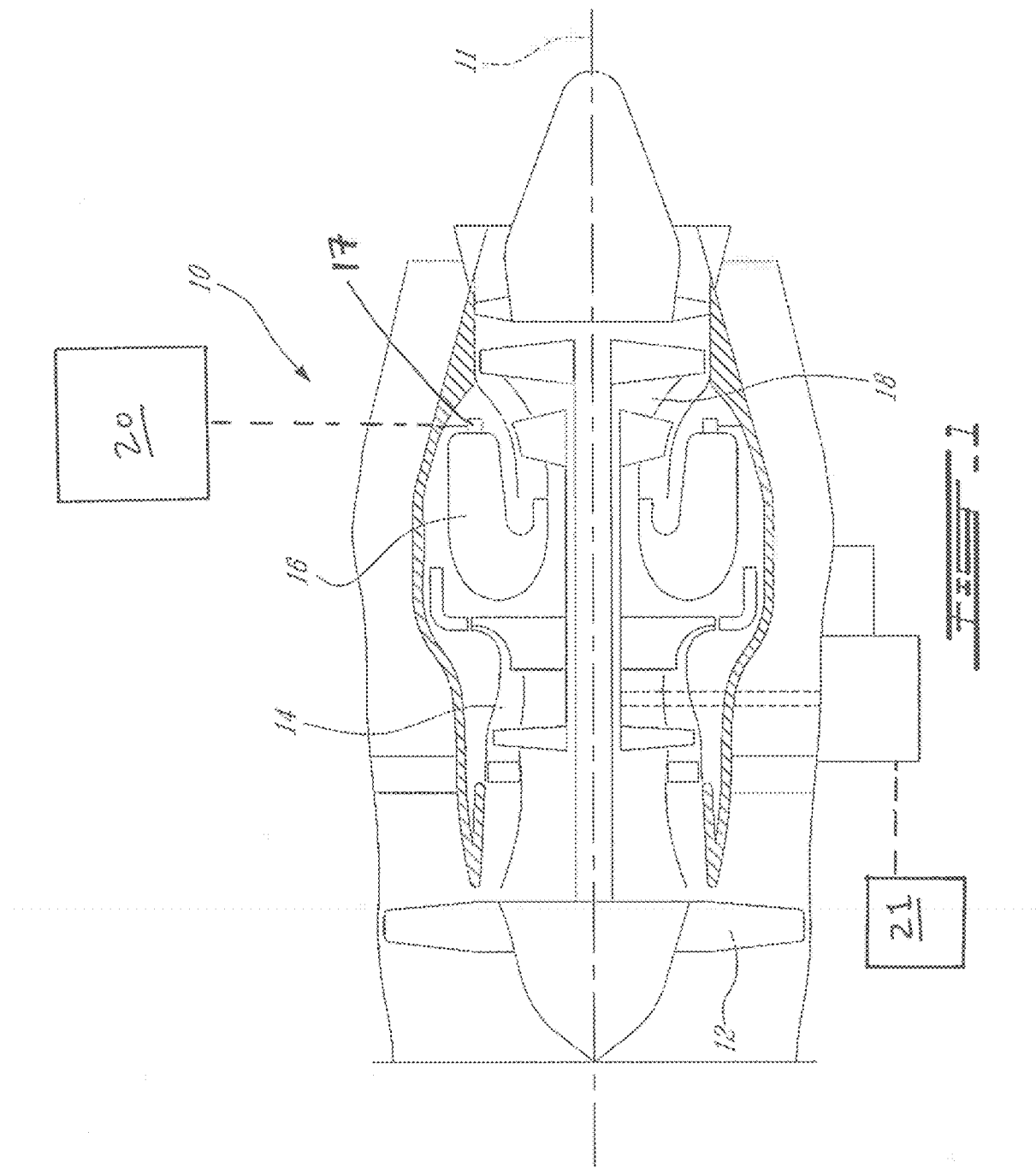
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel injected by a plurality of fuel nozzles 17 and ignited for generating an annular stream of hot combustion gases, and a turbine section 18 for extracting energy from the combustion gases.

The gas turbine engine 10 includes one or more fluid systems, which may include but are not limited to a fuel system 20 and an oil system 21, having at least one liquid pump that provides motive flow of a liquid (e.g. fuel or oil) through the fluid system. The fuel system 20 provides the combustor 16 with fuel at the required pressure and flow for combustion, and permits control of the engine power. The gas turbine engine 10 also includes an oil system 21, which provides lubrication to rotating components of the engine 10. One or both of the fuel system 20 and the oil system 21 of the gas turbine engine 10 is provided with an integrated fire mitigation system 30 as will be described herein. The terms "fluid system" and "liquid distribution system" as used re intended to comprise one or both of the fuel system 20 and the oil system 30 of the gas turbine engine 10.

As noted above, most existing fire detection and mitigation systems for gas turbine engines require electric sensors placed in fire critical regions, within and/or around the engine, and therefore require other associated electric systems and/or electronics connected with these sensors. Such electric/electronic fire detection and prevention systems are therefore necessarily dependent upon electrical systems, including sensors and switches, for actuation and proper operation.

The fire mitigation system 30 of the present disclosure, however, is entirely self-actuating and mechanical in nature, and does not require, nor rely on, any electrical sensors, electronics, or electrical systems for actuation and/or operation. The term "mechanical" as used herein with reference to the fire mitigation system 30 is understood to mean a system not requiring any electronic or electrical components, sensors or actuators, whether for the detection of a fire condition and/or actuation of the presently described system to mitigate the effects of a fire.

The term "fire condition" as used herein is understood to include fire itself, whether with or without visible flames, and also high heat conditions which occur in the presence of, or are indicative of, fire, whether or not flames are actually present. A "fire condition" may therefore include a condition in which high temperatures are generated, but without the presence of any flames.

In the event of such a fire condition in or around the gas turbine engine, it is particularly undesirable for pumps of the fluid system(s) (e.g. the fuel system 20 and/or the oil system 21) of the gas turbine engine 10 to continue to operate, as this may increase the risk of the fire spreading or increasing in severity. Accordingly, in the event of a fire condition, the fire mitigation system 30 as described herein causes the liquid pumps of the liquid distribution system(s) to cease their motive pumping operation, and this without requiring any electronics or associated electrical systems.

While the fire mitigation system 30 and fire resistant architecture described herein will be now described, for exemplary purposes only, with specific reference to its application in a fuel system 20 of the gas turbine engine 10, it is to be understood that the present fire mitigation system 30 and fire resistance architecture can be similarly applied to the oil system 21 of the gas turbine engine, or other fluid systems within, attached to, or used in conjunction with, airborne gas turbine engines. These other fluid systems may include, for example, airframe and/or aircraft fluid systems including fuel tanks, fuel and oil systems, and the like. With particularly reference to the oil system 21 of the gas turbine engine 10, the oil system 21 includes (much as per the fuel system 20, as will be described below) pumps, such as positive displacement gear pumps, which serve as oil scavenge pumps, oil distribution pumps, and the like.

Figure 2:
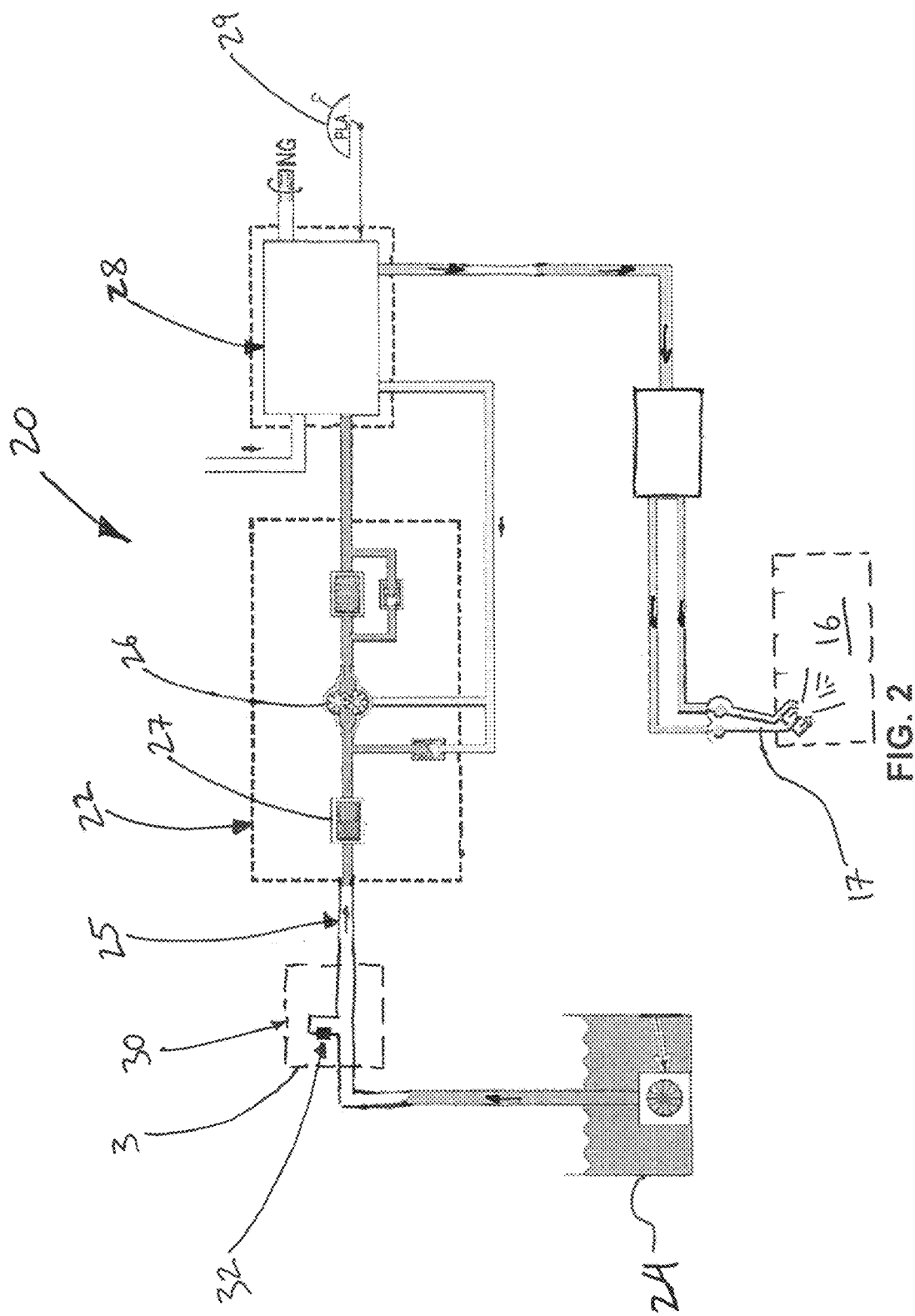
FIG. 2 is a schematic diagram of the fuel system of the gas turbine engine of FIG. 1.

Referring now to FIG. 2, the fuel system 20 of the gas turbine engine 10 includes one or more fuel pump units 22 which help feed the fuel from the fuel tank 24 to the fuel nozzles 17 within the combustor 16. The fuel pump unit 22 is disposed inline within the fuel conveying conduit(s) 25 which fluidicly interconnect the fuel tank 24 and the fuel nozzles 17. The fuel pump unit 22 includes at least a fuel pump 26, and may further include one or more filters 27 located upstream and/or downstream of each pump 26. The fuel pump 26 may be a positive displacement pump, and in at least one embodiment, the fuel pump 26 is a gear pump.

A fuel control unit (FCU) 28 is disposed downstream of the fuel pump unit 22 but upstream of the fuel nozzles 17, and is operable to control the fuel flow through the fuel system 20 and thus the fuel flow provided to the fuel injectors 17 within the combustor 16. The FCU 28 may be any suitable fuel control unit for a gas turbine engine, for example a hydro-mechanical system, an electronic engine control (EEC), a full-authority digital engine control (FADEC), or a combination of the above. Generally, however, the pilot or operator of the engine uses a power lever 29 to control the FCU 28 and thus desired power output of the engine 10, and the FCU 28 acts to measure and determine the amount of fuel needed at any particular time to deliver the requested engine power, and therefore permits the output of the required amount of fuel flow downstream of the FCU 28 toward the fuel nozzles 17 for injection into the combustor 16.

Referring still to FIG. 2, the fuel system 20 includes at least one (i.e. one or more) liquid pumps in the form of the fuel pump units 22, each having at least one liquid fuel pump 26 therein. The liquid fuel pump 26 may include, in at least one embodiment, a positive displacement gear pump. Gear pumps are often used in gas turbine engine fuel systems, as they can be driven by the mechanical, rotary power of the engine, are typically reliable, and not dependent on, or overly sensitive to, their orientation in space, which can significantly change depending on the attitude of the aircraft and thus its engines 10.

Fuel pumps in general, and positive displacement pumps in particular, are however susceptible to "starvation" if insufficient upstream fuel feeds the pump. Pump starvation occurs when the intake of liquid (in this case fuel or oil, for example) into the pump is less than the capacity of the pump to discharge. Because air or other gases in the liquid feeding the pumps naturally displaces a like volume of fuel, the greater the amount of gas in the fuel that is drawn in by the pump, the less fuel the pump is able to discharge downstream. Consequently, when the amount of air or gas in the liquid (e.g. fuel, oil, etc.) feeding and upstream of the pump becomes greater than the liquid discharge capacity of the pump, the pump is simply no longer able to output liquid and thus will simply cease discharging fuel downstream therefrom. Stated differently, introducing a sufficient quantity of air into the fuel system at a location upstream of the fuel pump, will cause the pump to starve by limiting fuel flow reaching the pump to a threshold level less than a discharge capacity of the fuel pump. This effectively causes the pump to cease pumping operation, even if the gears of the pump 26 are still turning.

The fire mitigation system 30 of the present disclosure provides an autonomously actuating and mechanical (i.e. entirely non-electric/electronic) means for deactivating the fuel system 20 in the event of a fire condition, and thereby provides an overall fire resistant "architecture" to the engine 10.

The fire mitigation system 30 is operable, when actuated, to "starve" any pumps located downstream therefrom (including but not limited to the fuel pump(s) 26 of the fuel pump unit(s) 22 and oil pumps of the oil system 21), by introducing a quantity of air into the fluid system upstream of the pump that is sufficient to starve the pump. By introducing air into the fluid system upstream of the pump, the pump will thus "starve"—i.e. it will not have sufficient fluid to feed it and thus will no longer be able to continue ejecting fluid downstream of the pump.

Figure 3A:
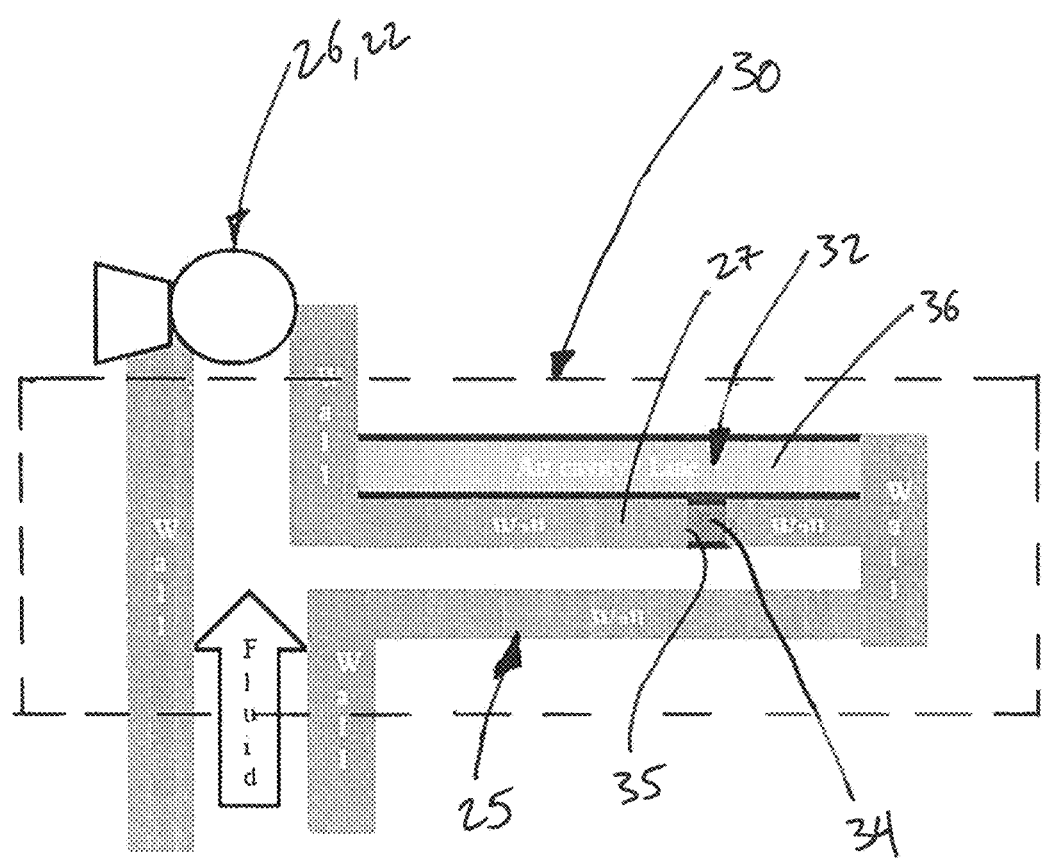
FIG. 3A is a schematic partial cross-sectional view of a portion of the fuel system taken from region 3 of FIG. 2, having a fire mitigation system with a sacrificial element shown in place during normal operation of the engine.
Figure 3B:
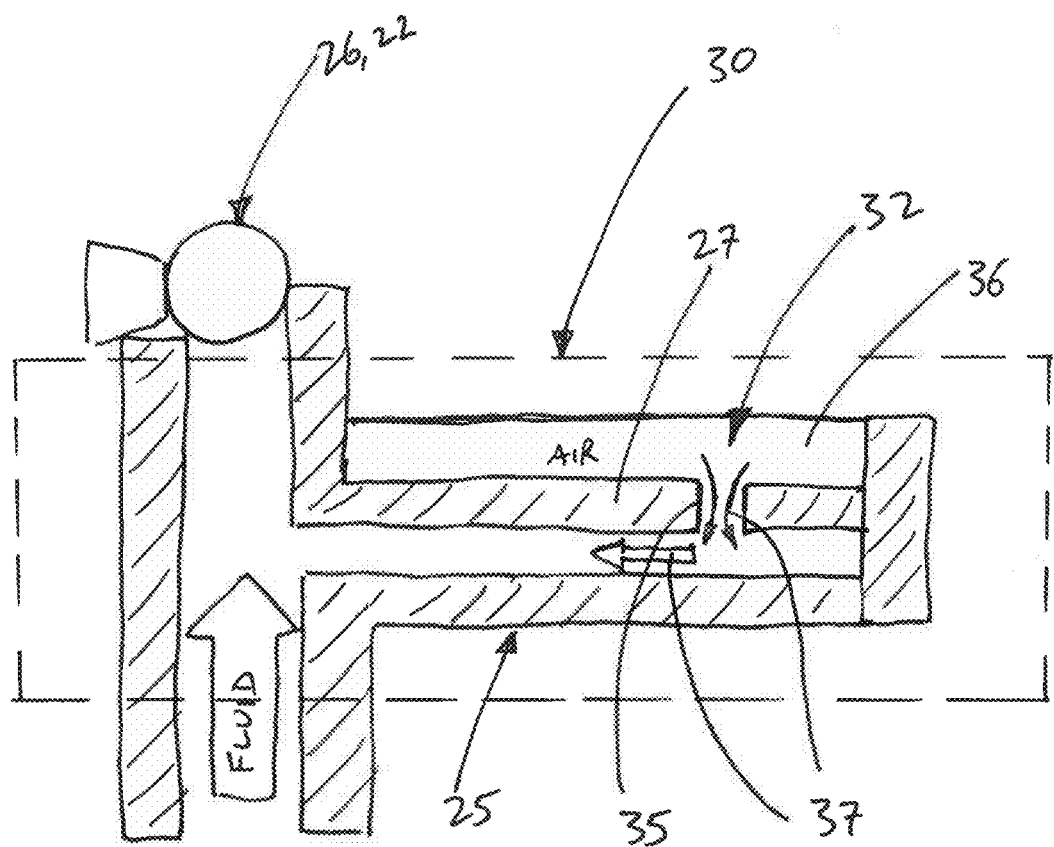
FIG. 3B is a schematic partial cross-sectional view of a portion of the fuel system taken from region 3 of FIG. 2, showing the fire mitigation system of FIG. 3A with the sacrificial element melted following a fire condition.

In the case of the embodiment in depicted FIGS. 2 and 3A-3B, the fire mitigation system 30 is disposed downstream of the fuel tank 24 but upstream of the first fuel pump unit 22 and thus the fuel pump 26 thereof (all relative to a direction of fuel from between the fuel tank 24 and the fuel injection nozzles 17).

The fire mitigation system 30 more specifically includes an air-introduction component 32 which disposed in fluid-flow communication with the fuel conveying conduits 25, upstream of the fuel pump 26 of the fuel pump unit 22. The air-introduction component 32 is operable to introduce air into the fuel system 20, upstream of the pump 26, when the fire mitigation system 30 actuated.

Referring to FIGS. 3A-3B, the air-introduction component 32 includes a sacrificial element 34 which is either separate from or integral with a fuel passage wall 27 of one or more of the fuel conveying conduits 25 of the fuel system 20. In one particular embodiment, the sacrificial element 34 of the air-introduction component 32 is a so-called "thermal plug" which comprises at least one sacrificial plug disposed (for example in a tight-fit engagement) within a pre-formed opening 35 in the fuel passage wall 27 of one or more of the fuel conduits 25. The sacrificial element 34 is however necessarily located upstream of the pump 26.

The sacrificial element 34 of the air-introduction component 32, which remains in place during normal operation of the gas turbine engine, has a predetermined heat-induced failure point that is lower than that of a remainder of the fuel conveying conduit 25 within which it is disposed. The term "heat-induced failure point" as used herein is understood to mean a measurable point (e.g. a temperature) at which the heat to which the sacrificial element 34 is exposed is high enough to cause the sacrificial element 34 to at least one of melt, deform, bend, crack, break or otherwise fail in a manner that will form an opening through which external air can enter the fluid system. This may include, but is not limited to, a melting point of the sacrificial element 34. Thus, the sacrificial element 34 is configured to "fail" (for example, melt, deform, etc.) when exposed to a threshold temperature greater than its heat-induced failure point, to an extent by which air is allowed to enter into the fuel conveying conduit 25 (either through or around the failed sacrificial element 34 or through an opening previously occupied by the sacrificial element 34 before it fails/melts). This air is allowed to enter into the fuel conveying conduit 25 upstream of the liquid fuel pump(s) 26. Such a threshold temperature is selected to correspond to high heats expected to be generated by a fire condition, as defined above.

The term "fail" and "failure" as used herein with reference to the sacrificial element 34 is understood to include, but is not limited to, melting (either partially or fully), deforming or otherwise mechanically failing in a manner which allows air to pass therethrough. Thus, for example, the sacrificial element 34 may be selected to have a predetermined melting point that is lower than that of the surrounding fuel passage wall 27 of the fuel conveying conduit 25 within which it is lodged. In one particular embodiment, for example, the sacrificial element 34 is made of a plastic material having a melting point that is lower than that of the surrounding fuel passage wall 27, made of a metal, within which it is disposed.

In one exemplary embodiment, the sacrificial element 34 is a plastic plug having a melting point of approximately 200-300 degrees C., which is less than a melting point of the surrounding metal fuel conveying conduits 25 that may be several multiples higher. For reference purposes, the melting point of common stainless steel is about 1400 degrees C.

In the event of a fire condition to which the air-introduction component 32 is exposed, the sacrificial element 34 will melt, thereby forming an air-inlet opening 35 in the fuel passage that was previously sealed by the sacrificial element 34, as shown in FIG. 3B. Once the sacrificial element 34 has partially or fully melted, thereby partially or fully opening the air-inlet opening 35, air from the air cavity line 36 and/or from the surrounding environment will enter into the fuel conveying conduit 25 (as shown at 37 in FIG. 3B) via this opening 35, upstream of the pump 26 of the fuel system 20. When a sufficient quantity of air 37 is allowed to enter into the fuel passages, the downstream pump 26 will starve, thus preventing any further pumping of fuel downstream of the pump 26. The aforementioned "sufficient" quantity of air is understood to be a quantity of air that causes the fuel flow reaching the pump to be less than a discharge capacity of the fuel pump. In other words, when the quantity of air ingested upstream of the pump 26 via the opening 35 is greater than the discharge capacity of the pump, the pump will starve. Once this low threshold level of fuel (and therefore the corresponding high threshold level of air) is reached, the pump 26 will cease to produce output flow.

A number of possible alternates exist to the aforementioned embodiment, for example a plurality of the sacrificial elements 34 may be provided throughout the fuel or other fluid system of the gas turbine engine 10. For example, one or more may be positioned at each of a number of fire-critical regions of the engine 10 and/or of the fuel system 20. However, it all cases the sacrificial element 34 are located upstream of the targeted pump, such that when actuated they will act to introduce air into the fluid system upstream of said pump. This may be, for example but not necessarily, in an area where the expected fluid pressure is low, in which case the sacrificial plug 34 need not be able to resist the high pressures.

Alternately, the sacrificial element 34 of the air-introduction component 32 may not necessarily be a separately formed "plug" made of a different material than the surrounding fuel passage.

Figure 4:
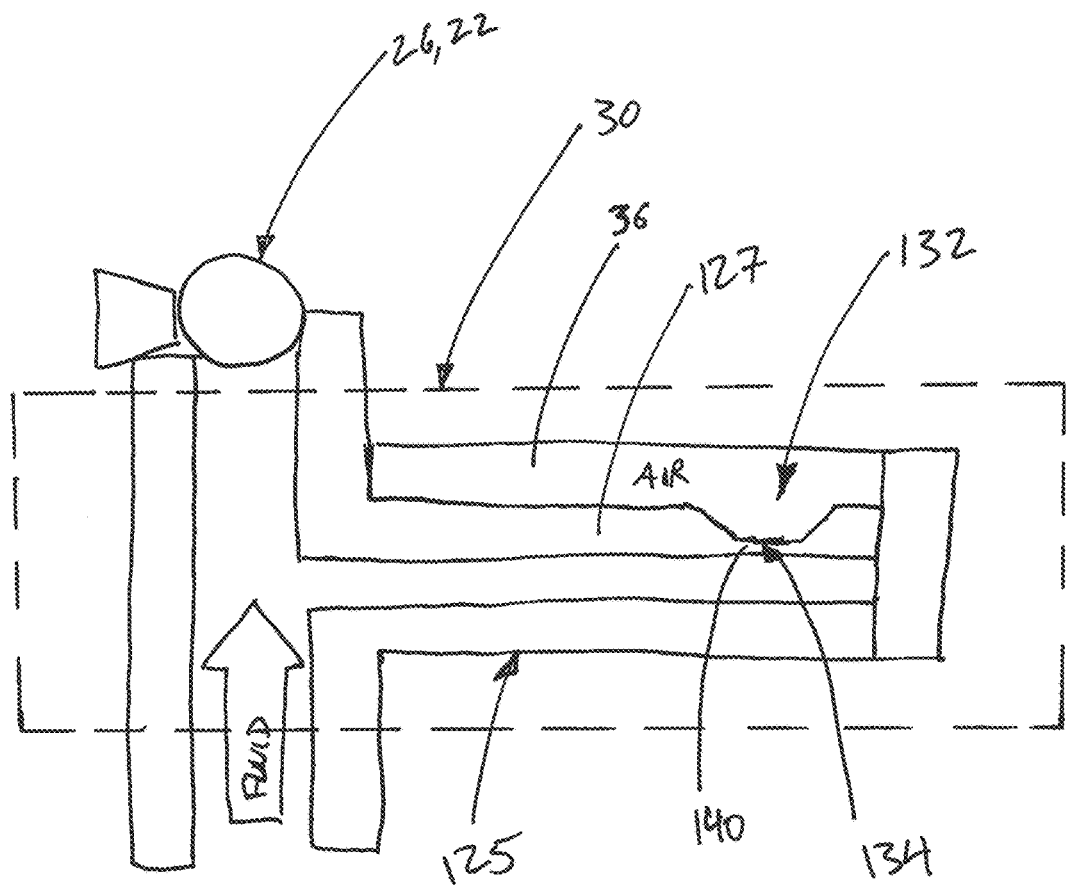
FIG. 4 is a schematic partial cross-sectional view of a portion of the fuel system taken from region 3 of FIG. 2, having a fire mitigation system with a sacrificial element shown in place during normal operation of the engine.

As shown in FIG. 4, the fire mitigation system 30 has an air-introduction element 132 in accordance with an alternate embodiment which includes a sacrificial element 134 that is composed of an integral, frangible, portion 140 of the fuel passage wall 127 of a fuel conveying conduit 125. The frangible portion 140 has at least one physical property (such as a thinner wall thickness, for example) that makes it more susceptible to deformation, cracking, breaking and/or melting (or any other form of mechanical failure—either partially or fully) than the surrounding fuel passage wall 127, upon exposure to local high temperatures caused by a fire condition, such as to thereby create an air-inlet opening in the fuel passage wall 127.

Other alternatives also exist, such as at least a portion of a fuel passage upstream of the pump being porous and (under normal conditions) filled with a material having a lower melting point than the remainder passage itself, whereby the filler material will melt upon exposure to a fire condition thereby resulting in a porous fuel passage. When the air pressure in the surrounding the fuel passage is greater than the low pressure fuel upstream of the pump, air will therefore be introduced into the fuel passage via the now-open pores thereof.

In all cases, however, the fire mitigation system 30 is not dependent on any electronic/electrical systems, sensor or switches, etc. for either detection of the fire condition and actuation of the fire mitigation system 30 by introducing air into the fuel system 20 upstream of the fuel pump(s) 22,26.

The above description is meant to be exemplary only, and one skilled in the art will recognize that changes may be made to the embodiments described without departing from the scope of the invention as claimed. Still other modifications which fall within the scope of the present invention will be apparent to those skilled in the art, in light of a review of this disclosure, and such modifications are intended to fall within the appended claims.

The invention claimed is:

1. A gas turbine engine comprising:
   a fluid system including at least one liquid pump providing motive flow of a liquid through the fluid system; and
   a fire mitigation system including an air-introduction component located in a fluid conveying conduit upstream of the at least one liquid pump, the air-introduction component having a sacrificial element which remains in place during normal operation of the gas turbine engine, the sacrificial element having a heat-induced failure point lower than that of a remainder of the fluid conveying conduit, the sacrificial element configured to fail when exposed to a threshold temperature greater than the heat-induced failure point to allow air entry into the fluid conveying conduit upstream of the at least one liquid pump, thereby starving the at least one liquid pump in the event of a fire condition generating said threshold temperature.

2. The gas turbine engine as defined in claim 1, wherein the sacrificial element and the remainder of the fluid conveying conduit are formed of different materials.

3. The gas turbine engine as defined in claim 2, wherein the sacrificial element has a lower melting point than the remainder of fluid conveying conduit.

4. The gas turbine engine as defined in claim 2, wherein the sacrificial element is plastic and the fluid conveying conduit is metal.

5. The gas turbine engine as defined in claim 1, wherein an air inlet opening is formed in the fluid conveying conduit when the sacrificial element fails, the air inlet opening having a size selected to ingest a predetermined quantity of air into the fluid system via the air inlet opening, the predetermined quantity of air being greater than a discharge capacity of the at least one liquid pump.

6. The gas turbine engine as defined in claim 1, wherein the fluid system includes a plurality of the liquid pumps, the fire mitigation system including one of said air-introduction components upstream of each of the liquid pumps.

7. The gas turbine engine as defined in claim 1, wherein the fluid system includes a fuel system having a fuel pump unit disposed between a fuel tank and fuel nozzles of the gas turbine engine, said at least one liquid pump comprising a fuel pump operable, in operation, to pump fuel to the fuel nozzles; and a fuel control unit located downstream from the fuel pump and disposed in communication therewith, the fuel control unit operable to control the fuel pump to vary fuel flow through the fuel system.

8. The gas turbine engine as defined in claim 1, wherein the at least one liquid pump comprises a positive displacement gear pump.

9. The gas turbine engine as defined in claim 1, wherein an air inlet opening is a pre-formed opening a wall of the fluid conveying conduit, and the sacrificial element is a sacrificial thermal plug received within the air inlet opening in tight fit engagement.

10. The gas turbine engine as defined in claim 1, wherein the sacrificial element includes a frangible portion of the fluid conveying conduit, the frangible portion being integrally formed with a wall of a remainder of the fluid conveying conduit.

11. The gas turbine engine as defined in claim 10, wherein the frangible portion has a physical property which renders sacrificial element more susceptible to heat-induced failure than the remainder of the fluid conveying conduit upon exposure to the fire condition.

12. The gas turbine engine as defined in claim 11, wherein the frangible portion of the fluid conveying conduit has a thinner wall thickness than that of the remainder of the fluid conveying conduit.

13. The gas turbine engine as defined in claim 1, wherein an air cavity line surrounds or is adjacent to a region of the fluid conveying conduit having the sacrificial element therein, the air cavity line being in fluid flow communication with the fluid conveying conduit via an air inlet opening formed when the sacrificial element melts, the air cavity line provided with air at a pressure greater than a pressure of the liquid flowing through said fluid system.

14. A fuel system of a gas turbine engine adapted to feed fuel from a fuel tank to fuel nozzles within the combustor of the gas turbine engine, the fuel system comprising:
a fuel pump unit disposed between the fuel tank and the fuel nozzles, the fuel pump unit including a fuel pump operable to pump fuel to the fuel nozzles; and
a fire mitigation system located upstream of the fuel pump unit and inline within a fuel conveying conduit interconnecting the fuel tank and the fuel pump unit, the fire mitigation system including an air-introduction component with a sacrificial element within the fuel conveying conduit which remains in place during normal operation of the gas turbine engine, the sacrificial element having a heat-induced failure point lower than that of a remainder of the fuel conveying conduit, the sacrificial element configured to fail when exposed to a threshold temperature greater than the heat-induced failure point to form an air inlet opening in the fuel conveying conduit upstream of the fuel pump unit and allow air introduction into the fuel system upstream of the fuel pump unit, thereby starving the fuel pump in the event of a fire condition generating said threshold temperature.

15. The fuel system as defined in claim 14, wherein the sacrificial element and the remainder of the fluid conveying conduit are formed of different materials, the sacrificial element having a lower melting point than the remainder of the fluid conveying conduit.

16. The fuel system as defined in claim 14, wherein the air inlet opening has a size selected to ingest a predetermined quantity of air into the fuel system via the air inlet opening, the predetermined quantity of air being greater than a discharge capacity of the fuel pump.

17. The fuel system as defined in claim 14, further a fuel control unit located downstream from the fuel pump unit and disposed in communication therewith, the fuel control unit operable to control the fuel pump unit to control fuel flow through the fuel system.

18. The fuel system as defined in claim 14, wherein the fuel pump comprises a positive displacement gear pump.

* * * * *